United States Patent [19]
Wilkerson

[11] Patent Number: 5,367,600
[45] Date of Patent: Nov. 22, 1994

[54] MOTOR CONTROL FOR A TREADMILL HAVING IMPROVED POWER SUPPLY AND IMPROVED SPEED REGULATION UNDER INTERMITTENT LOADING

[76] Inventor: Alan W. Wilkerson, c/o The Gemini Company, W61 N14280 Taunton Ave., P.O. Box 191, Cedarburg, Wis. 53012

[21] Appl. No.: 917,886
[22] Filed: Jul. 21, 1992
[51] Int. Cl.$^5$ ............................................. H02P 5/17
[52] U.S. Cl. .............................. 388/811; 388/907.2; 388/910; 388/902; 318/107
[58] Field of Search .................. 318/798–803, 318/807–811, 599, 105–108, 109–113; 388/809–815, 906, 907.2, 910, 902; 363/65, 67, 68–70, 74; 323/234, 265, 271, 280

[56] References Cited

U.S. PATENT DOCUMENTS

| | | | |
|---|---|---|---|
| 4,118,768 | 10/1978 | Wilson, Sr. | 363/85 |
| 4,127,895 | 11/1978 | Krueger | 363/86 |
| 4,333,046 | 6/1982 | Lee | 323/231 |
| 4,567,537 | 1/1986 | Kalkhof et al. | 361/81 |
| 4,642,746 | 2/1987 | Lösel | 363/49 |
| 4,819,145 | 4/1989 | Maeba | 363/63 |
| 4,839,570 | 6/1989 | Saganovsky | 388/815 |
| 4,888,813 | 12/1989 | Penn et al. | 388/838 |
| 4,910,447 | 3/1990 | Masters | 318/599 |
| 4,999,556 | 3/1991 | Masters | 318/599 |

Primary Examiner—William M. Shoop, Jr.
Assistant Examiner—D. Martin
Attorney, Agent, or Firm—Andrus, Sceales, Starke & Sawall

[57] ABSTRACT

A motor control for a treadmill has an improved, inexpensive, and simple set of power supplies, derived from the bus voltages of the DC busses with simple voltage dividers, to supply operational amplifiers connected to the positive DC voltage bus with a dual voltage supply and a common or neutral, and to provide a single voltage power supply connected to the negative bus for the driving circuitry of a motor energization switching controlling element. The dual power supply for the operational amplifiers comprises a voltage divider containing two, series connected zener diodes in series with a resistor. The one of the series connected zener diodes is connected to the positive DC voltage bus, and the resistor is connected to the negative DC voltage bus. A common connection between the two zener diodes becomes the neutral or common voltage for the operational amplifiers, and the zener diode voltages become the positive and negative supply voltages for the amplifiers. The power supply for the driving circuitry of the switch element is structured with a voltage divider comprising one zener diode and a series connected resistor. In this case, the zener diode is connected to the negative bus and the resistor to the positive bus. Isolation between the two power supplies is accomplished with optical, capacitive, or transformer isolation. The regulating circuit of the motor control may include circuitry for compensation for the inductance voltage drop in the armature circuit of the motor.

15 Claims, 3 Drawing Sheets

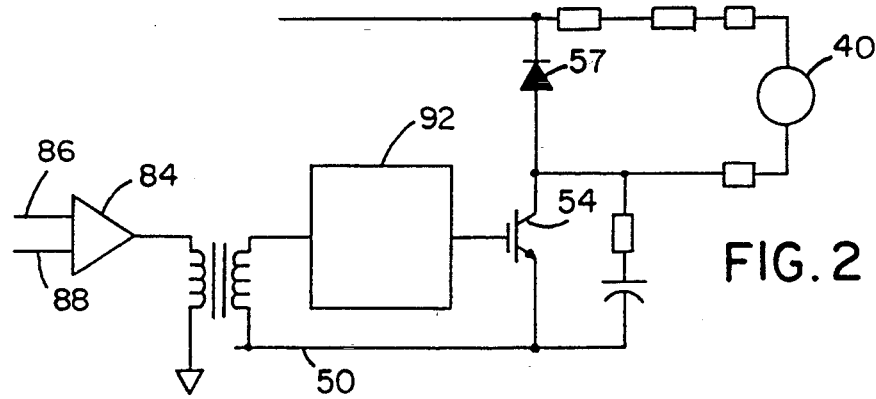
FIG. 2
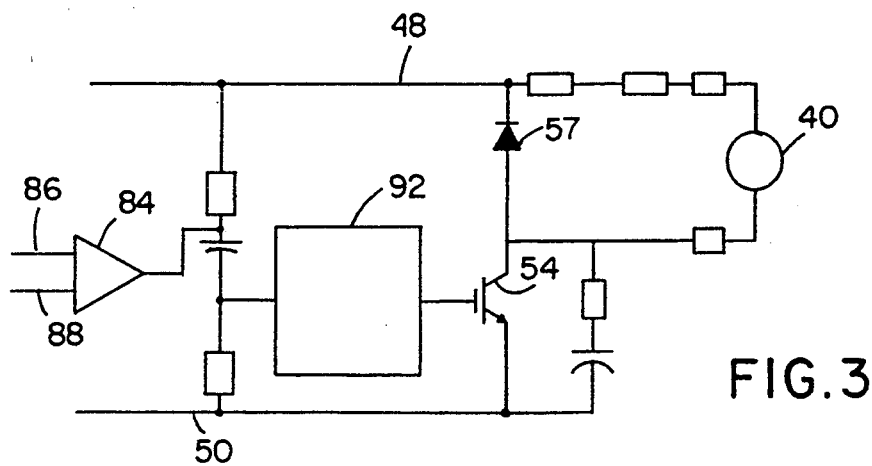
FIG. 3
FIG. 4
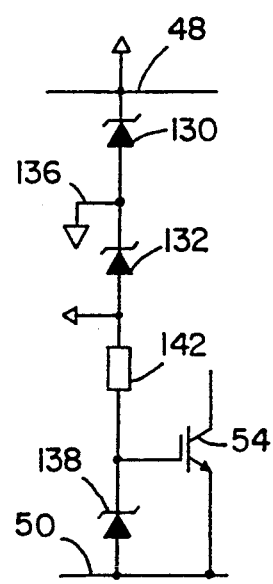

MOTOR CONTROL FOR A TREADMILL HAVING IMPROVED POWER SUPPLY AND IMPROVED SPEED REGULATION UNDER INTERMITTENT LOADING

The present invention is directed to an electric motor control for a treadmill having an improved power supply and providing improved speed regulation under intermittent loading.

In a treadmill drive, the motor drives an endless belt on which a person runs for exercise or for electrocardiographic or other medical evaluation. The endless belt typically extends between two spaced rollers. A support member, of wood or other material, lies beneath an upper span of the belt. The electric motor drives one of the rollers to move the belt over the support. DC motors are commonly used to drive the treadmill because of the wide range of speeds available from such a motor.

Each time a foot of the person on the treadmill descends onto the belt, the belt is pinched between the person's shoe and the support structure for the belt. The friction between the belt and the support structure, as well as the inertia of the person's body, tends to slow or stop the belt. When the shoe lifts off the belt, the retarding forces are released. The result is that the motor driving the belt is subjected to abrupt, intermittent loading each time a shoe of the runner descends onto the treadmill belt and lifts off the belt.

Treadmill drives currently in use are often unable to maintain constant belt speed in the face of such extreme intermittent load applications, with the result that speed variations occur in the belt. These variations may be distracting, or detrimental, to a person attempting to run at a constant speed on the treadmill.

Some of the reasons for the inability of existing treadmill drives to operate satisfactorily are as follows. In many cases, the drive comprises a DC motor driven by a control employing silicon controlled rectifiers (SCRs) or other elements operating from an AC line. These elements operate periodically in accordance with the frequency of the AC line. Since the line frequency is 50 or 60 Hertz, even with full wave circuitry, the opportunities for establishing new electrical conditions in the drive are spaced 8 to 10 milliseconds apart. As a practical matter, accurately establishing a new operative condition for the silicon controlled rectifiers takes even longer. Hence, the motor control is not capable of responding as fast as the application of transient loads to the treadmill so that the driving motor changes speed.

A mechanical flywheel is sometimes incorporated in the treadmill drive in an effort to reduce transient load variation to a level that is within the response time of the control. But this adds cost and bulk to the drive.

Another approach is to use pulse width modulated controls operating at higher frequencies. This can reduce the delay in obtaining changes in electrical conditions in the control and substantially improve transient speed regulation of the motor.

However, a more basic shortcoming of existing treadmill controls is that they fail to compensate for the voltage drop under transient conditions due to the inductance of the armature of the DC motor.

In a DC motor control, speed regulation is carried out by regulating the voltage applied to the armature of the motor. It is also customary to provide so-called "IR compensation" in such controls to improve speed regulation when varying loads are applied to the motor. To this end, the armature current I is measured. If the load on the motor changes, for example increases, the counter electromotive force (CEMF) of the motor will decrease and the armature current will increase. An electrical signal derived from the armature current is used to correspondingly increase the voltage applied to the motor armature to restore the CEMF and the speed of the motor to the original level. This action compensates for the $I \times R$ voltage drop in the armature circuit, hence the term IR compensation. The quantity R is the resistance of the armature circuit.

While a control having IR compensation is effective in improving steady state regulation of motor speed, it may still allow substantial transient speed deviations in a treadmill drive because of the extremely fast load changes.

Poor transient speed regulation in treadmill drives occurs for the following reason. The motor armature, which is essentially a coil of wire, has an inductance L as well as resistance R. When the armature current changes, during transient conditions, a voltage drop resulting from the presence of the inductance, as well as the IR voltage drop across the armature circuit resistance, appears in series with the CEMF of the armature. The magnitude of this voltage drop is proportional to the product of the armature inductance and the rate of change of the current, or $L \times dI/dt$. This inductive voltage drop reduces the portion of the terminal voltage that is applied to the armature, in the same manner as does the IR drop, thereby reducing the CEMF even further than the reduction caused by the IR drop itself. In addition, the inductive voltage drop slows down the build up of armature current which is needed to develop torque to counteract the increased motor load.

The time constant of a typical armature circuit, L/R, may range from 10 to 50 milliseconds so that the transient speed changes resulting from the inductance of the armature circuit can be significant in a treadmill drive, in which the load may change in a spar of time that is shorter than the armature circuit time constant.

For most ordinary applications, where load changes are more gradual, the inductive effect is noticed barely or not at all, and conventional IR compensation is adequate.

Further, with an SCR based control, the limitations imposed by the line frequency make it impractical to react fast enough to overcome the inductive drop, even if attempted. However, with pulse width modulated controls, if no attempt is made to compensate for the inductive voltage drop, transient speed regulation will not be that of which the drive is capable.

In the controls of DC motor drives, including those for use in treadmills, a variable, controlled DC voltage source is connected to the motor armature for supplying the regulated armature voltage to the motor. In the case of SCR controls, the AC line voltage is applied to the armature during a portion of each half cycle, and the average voltage applied to the motor armature depends on the selection of greater or lesser portions of each half cycle.

In a pulse width modulated control, a pair of DC voltage busses of fixed voltage are obtained from an ordinary, non-controlled rectification circuit. The voltage is electrically filtered to reduce the AC component or ripple voltage in the busses. The bus voltage is usually relatively high, such as 170 volts for a 120 volt AC line or 340 volts for a 220 volt AC line.

A switch element in one of the busses, is connected in series with the motor armature which, in turn, is connected to the other bus. The switch element is operated in an on-off duty cycle manner to control the average voltage across the motor armature. The switch element is typically a semiconductor component, such as an isolated gate bipolar transistor (IGBT) or power metal oxide semiconductor field effect transistor (MOSFET). In general, these devices are controlled by driving circuitry that applies a relatively small driving voltage between the negative terminal of the device and a control terminal, usually referred to as a "gate".

While the switch element may be connected to either the positive or negative DC voltage bus, it is most convenient to connect it to the negative bus. The motor armature is then connected between the positive DC voltage bus and the positive terminal of the switch element. When connected in this manner, the driving signal and its power supply can be connected directly to the negative voltage bus along with the negative terminal of the switch element. Also, the power supply for the driving circuitry can easily and inexpensively be derived from the DC bus voltage, with a simple voltage divider.

On the other hand, if the positive terminal of the switch element is connected to the positive DC voltage bus, with the motor armature connected between the negative terminal of the switch element and the negative DC voltage bus, the voltage at the negative terminal of the switch element will swing essentially from that of the negative DC voltage bus to that of the positive DC voltage bus during each switching cycle, and the driving signal and its power source will have to follow these large excursions at the switching frequency. To accommodate these large voltage swings requires that both the driving signal and its power supply be isolated from the bus voltage, so that they can "float" along with the negative switch element terminal. This adds significantly to the cost and complexity of the control circuitry.

With the switch element connected to the negative DC voltage bus, and the motor armature connected to the positive DC voltage bus, armature current sensing for purposes of compensating for IR voltage drops is most conveniently obtained at the positive DC voltage bus. A free wheeling diode is placed in parallel with the armature to provide a path for armature current during times when the switch element is off, and a small resistor is connected between the positive bus and the motor armature terminal. The voltage across this resistor is used to measure the armature current.

Operational amplifiers are generally used to provide the regulating functions of the control, and since the voltage of the armature, and the current sensed by the resistor described above, are directly connected to the positive bus, it is most convenient to also tie such regulating amplifiers to the positive DC voltage bus.

Further, circuits utilizing operational amplifiers have the most straightforward design if the amplifiers can be powered by a dual voltage supply having both positive and negative voltages with respect to a signal common or neutral.

With the regulating circuitry tied to the positive bus, and the driving circuitry for the switch element connected to the negative bus, it is necessary to provide an isolating coupling between the two portions of the control.

It is, therefore, one object of the present invention to provide an improved motor control that has improved speed regulation under intermittent load conditions, including the rapidly repetitive intermittent loadings characterized by applications such as treadmill drives.

This is accomplished by providing a control having compensation for the inductive component of the armature circuit impedance, as well as for the resistive component. The inductive voltage drop due to transient changes in loading, as well as the resistive voltage drop due to both steady state and transient conditions are thus accounted for in establishing the armature voltage. Specifically, the armature voltage is increased to compensate for both such voltage drops so that the CEMF, and hence the speed, of the motor does not change. The treadmill coupled to the motor thus maintains a highly uniform speed.

It is a further object of the present invention to provide an improved, inexpensive, and simple set of power supplies, derived from the bus voltages of the DC busses with simple voltage dividers, to supply operational amplifiers connected to the positive DC voltage bus with a dual voltage supply and a common or neutral, and to provide a single voltage power supply connected to the negative bus for the driving circuitry of the switch element.

The dual power supply for the operational amplifiers comprises a voltage divider containing two, series connected zener diodes in series with a resistor. The one of the series connected zener diodes is connected to the positive DC voltage bus, and the resistor is connected to the negative DC voltage bus. Constant voltage drops appear across the zener diodes over a wide range of currents. A common connection between the two zener diodes becomes the neutral or common voltage for the operational amplifiers, and the zener diode voltages become the positive and negative supply voltages. Since the common or neutral voltage differs from the voltage of the positive DC voltage bus by the amount of one zener diode voltage, amplifiers used to derive feedback signals related to the positive bus are operated in a standard differential mode.

The power supply for the driving circuitry of the switch element is structured in a similar manner, with a voltage divider comprising one zener diode and a series connected resistor. In this case, the zener diode is connected to the negative bus and the resistor to the positive bus.

The previously mentioned isolated coupling between the two power supplies is accomplished with optical, capacitive, or transformer isolation.

The present invention will be further understood by reference to the following detailed description and accompanying drawing in which:

FIG. 2 is a modification of the isolation circuitry of the motor control;

FIG. 3 is another modification of the isolation circuitry;

FIG. 4 shows a modification of a portion of the motor control;

Figure 1:
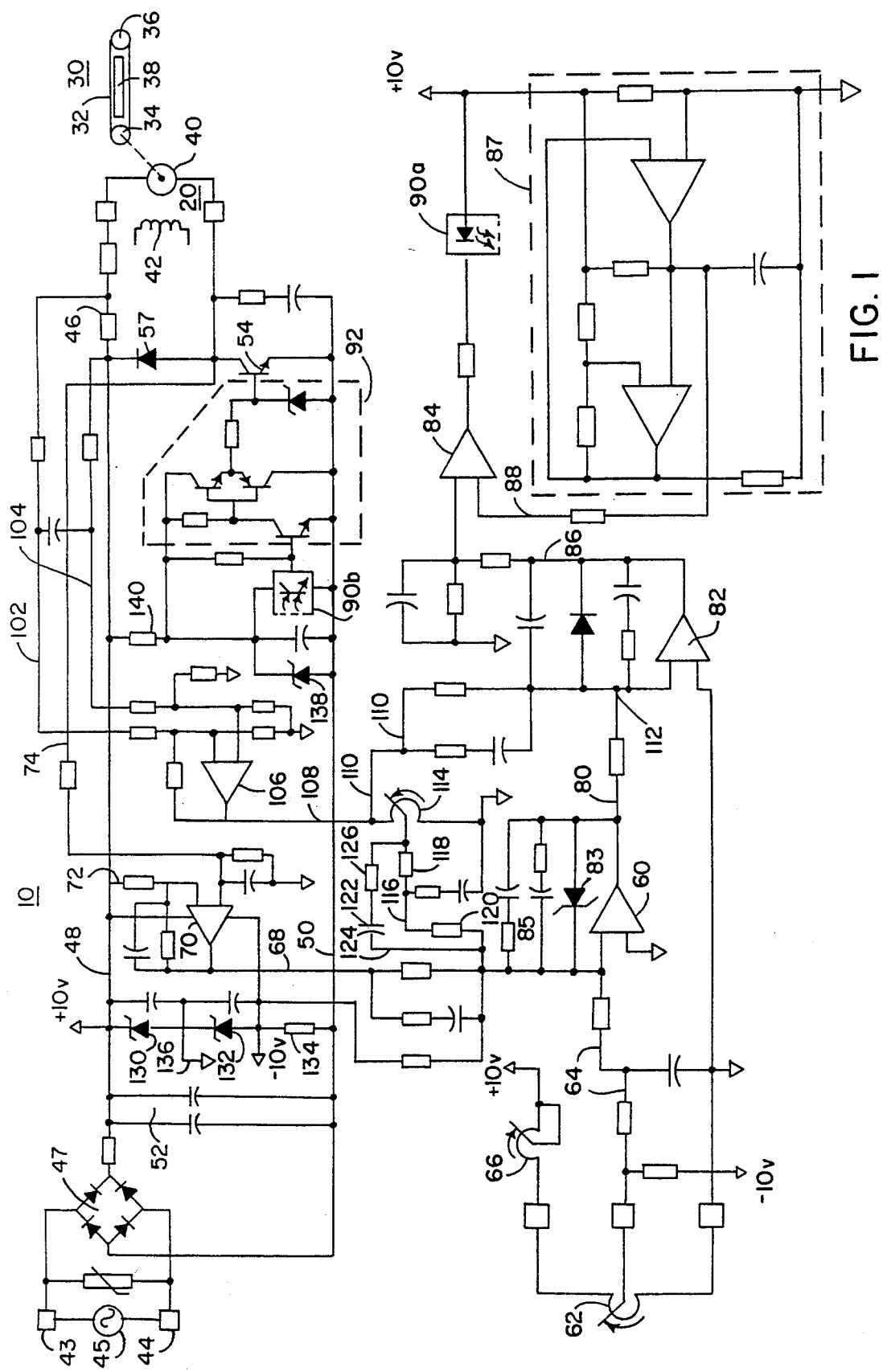
FIG. 1 is a schematic diagram of the improved motor control of the present invention.

In FIG. 1, motor control 10 operates DC motor 20 driving treadmill 30. Treadmill 30 comprises a continuous belt 32 extending between rollers 34 and 36. A support member 38, formed of wood or other material, lies beneath the upper span of belt 32.

Motor 20 may comprise a DC motor having armature 40 and field element 42. Field element 42 may be an electromagnet, as shown, or a permanent magnet.

The input terminals 43 and 44 motor control 10 are coupled to an alternating current power source 45, such as conventional 120 volt, 60 Hertz power mains. The alternating current of power source 45 is applied to the input terminals of a full wave rectifier bridge 47. The output terminals of the voltage DC voltage rectifier bridge are connected to positive DC bus 48 and negative DC voltage bus 50. A capacitive filter 52 is connected across busses 48 and 50. Bus 48 is connected to armature 40 to energize the armature. Bus 48 contains current sensing resistor 46. Freewheeling diode 57 is placed across armature 40.

A high speed switching element 54, such as an IGBT, MOSFET, or other semiconductor device is connected between negative DC voltage bus 50 and the negative terminal of motor armature 40. As described above, while switching element 54 may be placed in either bus 48 or 50, it is preferable to place the switching element in negative bus 50 so that the drive voltage necessary to operate the switching element may be more conveniently obtained and applied.

Switching element 54 is operated in an on/off duty cycle controlled basis at a high frequency to provide pulse width modulation energization to armature 40. Diode 57 provides a path for the inductive current of armature 40 during the off periods of switch 54. A typical operating frequency for switching element 54 is 20 kilohertz. This reduces or eliminates any audible noise to a user of treadmill 30. The use of such a frequency in operating switching element 54, also facilitates increasing the speed of response of control 10 since the intervals at which controlling action can be modified are very short.

In the regulating portion of control 10, amplifier 60 is an armature voltage regulating amplifier. A reference signal for amplifier 60 is obtained from speed control potentiometer 62 and provided to the amplifier in conductor 64. Speed control potentiometer 62 is adjusted in accordance with the speed desired for armature 40 and treadmill 30. Potentiometer 66 is used to establish the maximum speed of armature 40 and treadmill 30.

Figure 5:
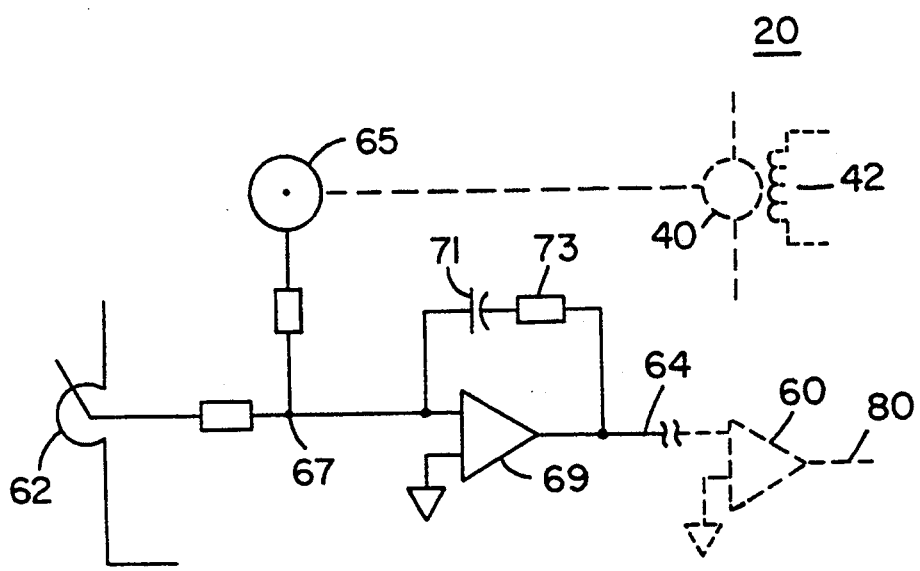
FIG. 5 shows a partial schematic diagram of an alternative input circuit for the control.

As an alternative and as shown in FIG. 5, the actual speed of motor 20 can be sensed, as by tachometer 65 coupled to motor 20. The output of tachometer 65 is provided to summing junction 67 as a speed feedback signal. The other input to summing junction 67 is the speed reference signal from potentiometer 62. The speed error signal is provided to amplifier 60 in conductor 64, via amplifier 69 having signal conditioning network 71, 73.

An armature voltage feedback signal is provided to amplifier 60 in conductor 68. This signal comprises the output of differential amplifier 70, the input terminals of which are connected across the terminals of armature 40 by conductors 72 and 74.

Zener diode 83, connected between the input and output of amplifier 60 limits the magnitude of the output signal of amplifier 60. The resistive-capacitive network 85 across amplifier 60 defines its operating characteristics. The voltage error output signal of voltage regulating amplifier 60 is provided in conductor 80. This signal in conductor 80 is applied as a current reference signal to armature current regulating amplifier 82.

An armature current feedback signal is obtained with the use of resistor 46 inserted in positive DC voltage bus 48. The voltage across resistor 46, and in conductors 102 and 104, is proportional to the armature current in armature 40. Conductors 102 and 104 are connected to the inputs of differential amplifier 106 which provides a current feedback signal in output conductor 108.

Output conductor 108 is connected to conductor 110 which is connected to summing junction 112 at the input of amplifier 82. The other input to summing junction 112 is the output signal from voltage regulating amplifier 60. An armature current regulating loop, including the armature current reference signal in conductor 80, the armature current feedback signal in conductors 102, 104, and 110, and armature current regulating amplifier 82 is thus formed within the armature voltage regulating loop which includes the armature voltage reference signal in conductor 64, the armature voltage feedback signal in conductor 68, and armature voltage regulating amplifier 60. The limiting of the output of amplifier 60 by zener diode 83 serves as an armature current limiting for armature 40.

The output of amplifier 82 is provided as the modulating signal to comparator 84 in conductor 86. The other input to comparator 84 comprises the output of sawtooth wave generator 87 in conductor 88. Comparator 84 drives an opto-isolator comprised of an optical transmitter such as a light emitting diode 90a optically coupled to a receiver such as a photo diode 90b. The output of opto-isolator receiver 90b is provided to driver circuitry 92. The output of driver circuitry 92 is provided to the control terminal of switching element 54 to provide pulse width modulated control of the voltage applied to armature 40.

IR compensation is provided by supplying the output of differential amplifier 106 in conductor 108 to the input of voltage regulating amplifier 60, via potentiometer 114, and conductor 116 containing resistors 118 and 120. Conductor 116 is connected to conductor 68 containing the armature voltage feedback signal. The polarity of the armature current feedback signal in conductor 116 is of a polarity to be additive to the voltage reference signal in conductor 64. Thus, the voltage regulated by amplifier 60 is increased responsive to increasing armature current in the motor. The increase in armature voltage serves to maintain the speed of motor 20 at a level proportional to the signal in the reference signal in conductor 64 in the face of variations in the treadmill load applied to motor 40.

In addition to the above described IR compensation, a feature of the present invention is to further provide compensation for the voltage drop in the armature circuit resulting from the inductance present in that circuit. To this end, the current feedback signal in conductor 108 is provided through potentiometer 114 to capacitor 122 in conductor 124. Capacitor 122 is connected to the input of voltage regulating amplifier 60 by conductor 68 and conductor 124. A high frequency noise limiting resistor 126 is connected in series with capacitor 122.

In operation, capacitor 122 develops a signal that is proportional to the rate of change of the armature current. This is accomplished by applying a voltage corresponding to the armature current across capacitor 122. The current flowing through the capacitor will be proportional to the rate of change of the armature current.

The polarity of the signal is such as to be additive to the voltage reference signal in conductor 64.

The signal generated across capacitor 122 is used to increase or "boost" the input to the armature voltage regulating amplifier 60 under conditions of sudden increases in the load, and hence motor armature current. The signal boost to armature voltage regulating amplifier 60 provides a corresponding increase in the armature voltage under transient conditions, insuring that the speed of motor 20 does not drop under intermittently increasing load conditions. The speed of motor 20 is thus regulated in a close and highly desirable manner.

The capacitance of capacitor 122 is selected in accordance with the magnitude of armature inductance so that the compensation will be proportional to the L di/dt voltage drop in the armature circuit. The magnitude of the boosting action may also be altered by the adjustment of potentiometer 114.

Figure 6:
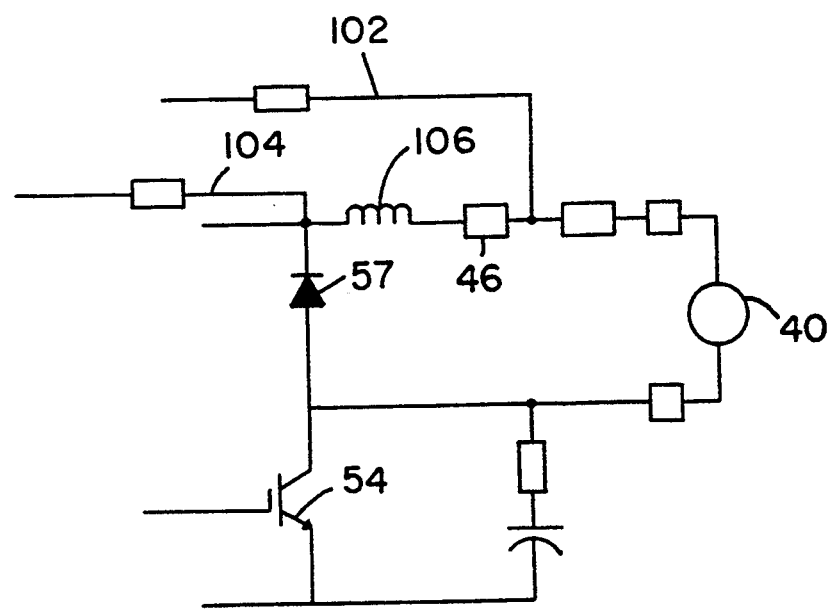
FIG. 6 shows a modification of the armature inductive voltage drop compensating circuit.

In the alternative, the desired feedback boost signal could be obtained by placing a small inductor 160 in series with resistor 46, as shown in FIG. 6. The size of inductor 160 is selected such that the L/R time constant of inductor 160 and resistor 46 resembles or equals the L/R time constant of the armature circuit of motor 20.

With switching element 54 connected to the negative DC voltage bus, it is necessary to drive switching element 54 with a driving voltage that is also connected to the negative DC bus voltage. However, the sensing of both the armature current and armature voltage is accomplished by circuitry connected to the positive DC voltage bus, since the armature is directly connected to this bus.

Further, electronic components such as amplifiers 60, 70, 82, and 106 and comparator 84 function best when both polarities of voltage are available with respect to a neutral common. The foregoing requirements are accomplished in an efficient economical manner as follows.

To provide the dual voltage power supply for the sensing and regulation portion of control 10, a pair of series connected zener diodes 130 and 132 and a series connected resistor 134 are connected across positive DC voltage bus 48 and negative DC voltage bus 50. A zener diode is an element that presents a constant voltage drop across it over a wide range of current. For example, a 10 volt voltage drop may appear across zener diode 130 and a further 10 volt voltage drop may appear across zener diode 132. A common connection 136 is provided intermediate diodes 130 and 132. This common connection 136 may be taken as the neutral or common for the regulating portions of control 10. With respect to common connection 136, the upper end of zener diode 130 is at positive 10 volts, while the lower end of zener diode 132 is at negative 10 volts. Voltages of both polarities, with a common between them, may thus be provided to elements such as the amplifiers and comparator in the regulating portion of the control.

In a typical construction, regulating amplifiers such as amplifiers 60 and 82 have their non-inverting input connected to the common connection. In the differential amplifiers, such as amplifiers 70 and 106, the reference input is connected to the common connection. With the use of differential amplifiers, the feedback voltages, which are related to the positive DC voltage bus, are shifted so they are with respect to the common voltage rather than the positive DC bus. This permits the present invention to work with the above-described power supply circuitry.

The power supply for driver 92 is similar in construction. That is, it utilizes zener diode 138 and resistor 140 connected across positive and negative DC voltage busses 48, 50. In this case, zener diode 138 provides a fixed voltage drop with respect to the negative DC voltage bus.

Since the power supply provided by zener diode 138 is separated by a substantial voltage from the dual power supply provided by zener diodes 130 and 132, the opto-isolator 90a–90b is utilized to provide isolated coupling for the switching signals generated by the regulating portion, and transmitted to the power portion of control 10. It would also be possible to provide this isolated coupling with a transformer, or a capacitor, as shown in FIGS. 2 and 3.

It would further be possible to combine resistors 134 and 140 in which case the circuitry would be modified as shown in FIG. 4 to have a single resistor 142.

It is claimed:

1. A drive for energizing a DC motor driving a treadmill, said drive comprising:
   a DC power supply having a positive polarity voltage bus and a negative polarity voltage bus, said buses being connectable to the treadmill drive motor;
   switching means in one of said buses for being connected in series with said DC motor for energizing the DC motor from said DC power supply to provide variable voltage to the DC motor;
   regulating means for controlling the operation of the DC motor, said regulating means including driving means for driving said switching means and amplifier means for controlling said driving means, said amplifier means being connected to one of said positive and negative polarity voltage buses, and said driving means connected to the other said positive and negative voltage buses;
   a dual polarity power supply for powering said amplifier means, said dual polarity power supply comprising first and second zener diodes connected in series, said series connected zener diodes being further connected in series with a first resistor, each of said zener diodes having a preselected voltage drop thereacross, said first zener diode having a first terminal connected directly to said one of said voltage buses, said first zener diode having a second terminal connected to a first terminal of said second zener diode, the connection of said second terminal of said first zener diode and said first terminal of said second zener diode comprising a common connection between said zener diodes, said second zener diode having a second terminal connected to a first terminal of said first resistor, a second terminal of said first resistor being connected to said other voltage bus, the zener voltage drops across said first and second zener diodes providing positive and negative constant magnitude voltages with respect to the common connection between said first and second zener diodes, the magnitude of said positive and negative constant magnitude voltages being that of the preselected zener voltage drops, the common connection and both said positive and negative constant magnitude voltages being provided to said amplifier means as operating voltages for powering said amplifier means; and
   a power supply for powering said driving means, said power supply comprising a third zener diode, said third zener diode having a first terminal connected directly to said other voltage bus, and a second terminal connected to a first terminal of a second resistor, a second terminal of said second resistor being connected to said one of said voltage buses, said third zener diode having a preselected voltage drop thereacross providing a constant magnitude voltage which is provided to said driving means as an operating voltage for said driving means.

2. The drive according to claim 1 further including isolation means between said amplifier means and said driver means.

3. The drive according to claim 2 wherein said isolation means comprises opto-isolation means.

4. The drive according to claim 2 wherein said isolation means comprises transformer isolation means.

5. The drive according to claim 2 wherein said isolation means comprises capacitive isolation means.

6. The drive according to claim 1, wherein said regulating means provides an output signal controlling the armature voltage applied to the motor, and wherein said drive comprises:
   means for providing a speed reference signal corresponding to the desired speed of said motor to said regulating means;
   means for providing an armature voltage feedback signal to said regulating means, said armature voltage feedback signal being supplied in opposition to said speed reference signal to produce an error signal for operating said regulating means to establish the armature voltage, and hence the speed of said motor;
   means for sensing the armature current of the motor;
   means coupled to said armature current sensing means for providing an IR compensating signal to said regulating means to compensate for the voltage drop resulting from the resistance of the armature circuit, said signal being provided in a manner that is additive to said speed reference signal for altering the output of said regulating means in a manner tending to establish the speed of said motor at that corresponding to said speed reference signal; and
   means coupled to said armature current sensing means for obtaining a signal corresponding to the additional voltage drop resulting from the inductance of the armature circuit when the motor is subjected to transient load changes and for providing said signal to said regulating means in a manner that is additive to said speed reference signal for altering the output of said regulating means in a manner tending to establish the speed of said motor during the transient load changes at that corresponding to said speed reference signal.

7. The drive according to claim 6 wherein said inductance voltage drop obtaining means comprises a capacitor subjected to a voltage proportional to the armature current.

8. The drive according to claim 7 further including a noise limiting resistor in series with said capacitor.

9. The drive according to claim 6 wherein said inductance voltage drop signal obtaining means includes an inductor subjected to the armature current.

10. The drive according to claim 1 wherein said regulating means provides an output signal controlling the armature voltage applied to the motor, and wherein said drive comprises:
    means for providing a speed reference signal corresponding to the desired speed of said motor to said regulating means;
    means for providing a speed feedback signal to said regulating means, said speed feedback signal being supplied in opposition to said speed reference signal to produce an error signal for operating said regulating means to establish the armature voltage and hence the speed of said motor;
    means for sensing the armature current of the motor; and
    means coupled to said armature current sensing means for obtaining a signal corresponding to the voltage drop resulting from the inductance of the armature circuit when the motor is subjected to transient load changes and for providing said signal to said regulating means in a manner tending to establish the speed of said motor during the transient load changes at that corresponding to said speed reference signal.

11. The drive according to claim 10 wherein said inductance voltage drop signal obtaining means comprises a capacitor subjected to a voltage proportional to the armature current.

12. The drive according to claim 11 further including a noise limiting resistor in series with said capacitor.

13. The drive according to claim 10 wherein said inductance voltage drop signal obtaining means includes an inductor subjected to the armature current.

14. The drive according to claim 1 wherein said first terminal of said first zener diode is connected directly to said positive DC voltage bus, said second terminal of said first resistor is connected to said negative DC voltage bus, and said first terminal of said third zener diode is connected to said negative DC voltage bus and said second terminal of said second resistor is connected to said positive DC voltage bus.

15. The drive according to claim 1 wherein said first resistor and said second resistor are combined as a single resistor connected between said second terminal of said second zener diode and said second terminal of said third zener diode so that said first, second, and third zener diodes and said single resistor are connected in series across said voltage buses.

* * * * *